United States Patent
Yao et al.

(10) Patent No.: US 12,507,406 B2
(45) Date of Patent: Dec. 23, 2025

(54) 3D MEMORY DEVICE

(71) Applicant: YANGTZE MEMORY TECHNOLOGIES CO., LTD., Hubei (CN)

(72) Inventors: Lan Yao, Hubei (CN); Lei Xue, Hubei (CN); Ziqun Hua, Hubei (CN); Siping Hu, Hubei (CN); Meng Yan, Hubei (CN); Pengan Yin, Hubei (CN); Yucheng Zhang, Hubei (CN)

(73) Assignee: YANGTZE MEMORY TECHNOLOGIES CO., LTD., Wuhan (CN)

(*) Notice: Subject to any disclaimer, the term of this patent is extended or adjusted under 35 U.S.C. 154(b) by 717 days.

(21) Appl. No.: 17/818,265

(22) Filed: Aug. 8, 2022

(65) Prior Publication Data

US 2023/0092768 A1 Mar. 23, 2023

(30) Foreign Application Priority Data

Aug. 9, 2021 (CN) .......................... 202110909609.0

(51) Int. Cl.
*H10B 41/40* (2023.01)
*G11C 16/04* (2006.01)
(Continued)

(52) U.S. Cl.
CPC ......... *H10B 41/40* (2023.02); *G11C 16/0483* (2013.01); *H01L 21/76898* (2013.01);
(Continued)

(58) Field of Classification Search
CPC ........ H10B 41/40; H10B 43/35; H10B 41/35; H10B 43/40; H01L 23/5226;
(Continued)

(56) References Cited

U.S. PATENT DOCUMENTS 8,211,716 B2 * 7/2012 Shinkawata ....... G01R 31/2884
257/E21.524
10,998,079 B2 5/2021 Kim et al.
(Continued)

FOREIGN PATENT DOCUMENTS

| CN | 106920797 A | 7/2017 |
|---|---|---|
| CN | 113097087 A | 7/2021 |
| CN | 113437060 A | 9/2021 |

*Primary Examiner* — Alonzo Chambliss
(74) *Attorney, Agent, or Firm* — Hanley, Flight & Zimmerman, LLC (57) ABSTRACT

The present disclosure discloses a three-dimensional (3D) memory, which includes a peripheral wafer and an array wafer. The peripheral wafer includes a first peripheral structure and a second peripheral structure. The array wafer includes a substrate, a structure to be tested and multiple interconnecting portions. The substrate includes a first well region and a second well region. The array wafer includes the structure to be tested which has a first connecting portion, a second connecting portion, and multiple interconnecting portions. The first peripheral structure is connected to the first well region and the first connecting portion of the structure to be tested by the first interconnecting portion and the second interconnecting portion respectively. The second peripheral structure is connected to the second well region and the second connecting portion of the structure to be tested by the third interconnecting portion and the fourth interconnecting portion respectively.

20 Claims, 4 Drawing Sheets

(51) Int. Cl.
  *H01L 21/768* (2006.01)
  *H01L 23/522* (2006.01)
  *H01L 23/528* (2006.01)
  *H01L 23/538* (2006.01)
  *H01L 25/065* (2023.01)
  *H10B 41/35* (2023.01)
  *H10B 43/35* (2023.01)
  *H10B 43/40* (2023.01)

(52) U.S. Cl.
  CPC ...... *H01L 23/5226* (2013.01); *H01L 23/5283* (2013.01); *H01L 23/5383* (2013.01); *H01L 23/5384* (2013.01); *H01L 23/5386* (2013.01); *H01L 25/0657* (2013.01); *H10B 41/35* (2023.02); *H10B 43/35* (2023.02); *H10B 43/40* (2023.02); *G11C 2213/71* (2013.01); *H01L 2224/32145* (2013.01); *H01L 2225/06541* (2013.01)

(58) Field of Classification Search
  CPC ............. H01L 23/5283; H01L 25/0657; H01L 23/5383; H01L 23/5384; G11C 16/0483; G11C 2213/71
  See application file for complete search history.

(56) References Cited

U.S. PATENT DOCUMENTS

| | | | |
|---|---|---|---|
| 11,387,154 B2* | 7/2022 | Oh | G11C 29/48 |
| 2014/0332975 A1* | 11/2014 | Raorane | H01L 24/19 |
| | | | 438/109 |
| 2015/0028486 A1* | 1/2015 | Liu | H01L 23/5389 |
| | | | 257/773 |
| 2020/0381316 A1 | 12/2020 | Lee et al. | |

* cited by examiner

3D MEMORY DEVICE

CROSS-REFERENCE TO RELATED APPLICATIONS AND INCORPORATED BY REFERENCE

This application claims priority to Chinese Patent Application No. 202110909609.0 filed on Aug. 9, 2021, which is incorporated herein by reference in its entirety.

TECHNICAL FIELD

The present disclosure relates to the technical field of semiconductors, and in particular, to a three-dimensional memory.

BACKGROUND

In three-dimensional (3D) memory, a storage array and a peripheral circuit are arranged on an array wafer and a peripheral wafer, respectively. The array wafer and the peripheral wafer are fabricated separately so that the peripheral circuit is not affected by the typical high temperatures and high pressures during the storage array processing. After the two wafers have been prepared, they can be bonded together such that the bonded array wafer and peripheral wafer are connected to each other through corresponding bonding contacts.

BRIEF SUMMARY

Embodiments of a 3D memory with an architecture that enables reliable bonding between the array wafer and the peripheral wafer are described in the present disclosure.

According to an embodiment of the present disclosure, the 3D memory comprises a peripheral wafer and an array wafer. The peripheral wafer can include a first peripheral structure and a second peripheral structure. The first peripheral structure can include a first peripheral circuit electrically connected to peripheral wafer bonding contacts through a plurality of peripheral wafer contact blocks. The second peripheral structure can also include a second peripheral circuit electrically connected to a plurality of peripheral wafer bonding contacts through a plurality of peripheral wafer contact blocks.

According to an embodiment, the array wafer can include a substrate, and a structure to be tested. The structure to be tested has its length along a first direction. The array wafer can further include a plurality of interconnecting portions located above the substrate, wherein the substrate can include a first well region and a second well region. On the array wafer, the structure to be tested includes a first connecting portion and a second connecting portion, and the plurality of interconnecting portions. The interconnecting portions include a first interconnecting portion, a second interconnecting portion, a third interconnecting portion and a fourth interconnecting portion. The first interconnecting portion, electrically connects the first peripheral structure and the first well region. The second interconnecting portion, electrically connects the first peripheral structure and the first connecting portion. The third interconnecting portion, electrically connects the second peripheral structure and the second well region. The fourth interconnecting portion, electrically connects the second peripheral structure and the second connecting portion.

In an embodiment, the structure to be tested can be a 3D storage array with one or more 3D storage strings. The first connecting portion and the second connecting portion of the structure to be tested comprise two ends of a word line in the 3D storage string, respectively.

In an embodiment, each of the plurality of interconnecting portions includes at least one set of array wafer connecting blocks and array wafer conductor layers that are alternately stacked in a second direction and spatially close to the peripheral wafer. The second direction is perpendicular to the first direction. The array wafer further includes a plurality of array wafer bonding contacts located at a contact surface of the array wafer close to the peripheral wafer, and a plurality of array wafer contact blocks, which are used for electrically connecting the interconnecting portions and the array wafer bonding contacts, respectively.

In an embodiment, the second interconnecting portion and the fourth interconnecting portion can have the same number and regular arrangement of stacked structures, which are formed of alternating array wafer connecting blocks and the array wafer conductor layers.

In an embodiment, the second interconnecting portion and the fourth interconnecting portion are each electrically connected to one of the array wafer bonding contacts through the same number and structure of array wafer contact blocks.

In an embodiment, the array wafer further comprises a first contact, and the first contact is located on a side of the first well region close to the peripheral wafer, and electrically connects the first well region and the first interconnecting portion.

In an embodiment, the array wafer further includes a second contact, located on a side of the second well region close to the peripheral wafer, and electrically connects the second well region and the third interconnecting portion In an embodiment, the peripheral wafer and the array wafer are bonded such that the peripheral bonding contacts are aligned and electrically connected to the corresponding adjacent array wafer bonding contacts. The structure to be tested is disposed with its length in a plane parallel to the peripheral wafer-array wafer contact surface. The bonding between the peripheral wafer and the array wafer can establish the connection between the peripheral circuit and the structure to be tested and the well regions. The bonded wafer arrangement can further establish the connection between the structure to be tested and the first well region and the second well region. The connections between each peripheral structure, the peripheral wafer interconnecting portions and the peripheral wafer contact blocks is described next.

In an embodiment, the first peripheral structure further includes a first peripheral circuit, a first and second peripheral wafer contact blocks that are located between the peripheral circuit and the peripheral wafer bonding contacts. One end of the first peripheral circuit can be connected to respective peripheral wafer bonding contacts through a peripheral wafer contact block, and a second end of the peripheral circuit can be connected to a second peripheral wafer bonding contact with a second peripheral wafer contact block. The first peripheral wafer contact block and a second peripheral wafer contact block are used to electrically connect the first peripheral circuit to the first peripheral wafer bonding contact and the second peripheral wafer bonding contact, respectively.

In an embodiment, the first peripheral structure includes a first peripheral wafer bonding contact and a second peripheral wafer bonding contact located on the peripheral wafer and at a peripheral wafer-array wafer contact surface. The first peripheral wafer bonding contact is electrically connected to the array wafer bonding contact and to the first interconnecting portion. The second peripheral wafer bonding contact is electrically connected to the array wafer bonding contact and to the second interconnecting portion.

In an embodiment, the second peripheral structure further includes a second peripheral circuit, and third and fourth peripheral wafer contact blocks that are located between the peripheral circuit and the peripheral wafer bonding contacts. One end of the second peripheral circuit is connected to a peripheral wafer bonding contact through the third peripheral wafer contact block and a second end of the second peripheral circuit is connected to a fourth peripheral wafer bonding contact with the fourth peripheral wafer contact block. The third peripheral wafer contact block and the fourth peripheral wafer contact block are used to electrically connect the second peripheral circuit to the third peripheral wafer bonding contact and the fourth peripheral wafer bonding contact, respectively.

In an embodiment, the second peripheral structure includes a third peripheral wafer bonding contact and a fourth peripheral wafer bonding contact located on the peripheral wafer and at a peripheral wafer-array wafer contact surface. The third peripheral wafer bonding contact is electrically connected to the array wafer bonding contact and also electrically connected to the third interconnecting portion. The fourth peripheral wafer bonding contact is electrically connected to the array wafer bonding contact and also electrically connected to the fourth interconnecting portion.

In an embodiment, the second peripheral structure further includes a second peripheral circuit and third and fourth peripheral wafer contact blocks located in a direction of the second peripheral circuit close to the array wafer. The third and fourth peripheral wafer contact blocks are used to electrically connect the second peripheral circuit to the third peripheral wafer bonding contact and the fourth peripheral wafer bonding contact, respectively.

The above summary of the present disclosure is only illustrative and is not intended to be limiting in any way. In addition to the illustrative aspects, embodiments, and features described above, other aspects, embodiments, and features will become apparent with reference to the drawings and the following detailed description.

BRIEF DESCRIPTION OF THE DRAWINGS

Other features, objectives, and advantages of the present disclosure will become more apparent by reading the detailed description of non-restrictive embodiments made with reference to the following drawings. In the drawings.

The present disclosure will be described with reference to the accompanying drawings.

DETAILED DESCRIPTION

In order to better understand the present application, various aspects of the present application will be described in more detail with reference to the drawings. It should be understood that the detailed description is merely description of exemplary implementations of the present application, and does not limit the scope of the present application in any way. Throughout the description, the same reference numerals refer to the same elements. The expression "and/or" includes any and all combinations of one or more of the associated listed items. Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present discloses.

It should be noted that in the present description, the expressions of first, second, third, etc. are only used to distinguish one feature from another feature, do not indicate any limitation on the feature, and in particular do not indicate any sequence. Therefore, without departing from the teaching of the present application, a first side discussed in the present application can also be referred to as a second side, and a first window can also be referred to as a second window, and vice versa.

In the drawings, for the convenience of explanation, the thickness, size, and shape of components have been slightly adjusted. The drawings are only examples and are not drawn strictly to scale. As used herein, the terms "approximately," "about," and similar terms are used as terms indicating approximation, not as terms indicating degree, and are intended to describe inherent deviations in measured or calculated values that would be recognized by an ordinary person skilled in the art.

It should also be understood that the expressions such as "comprise," "comprising," "having," "include" and/or "including" are open rather than closed expressions in the present description, which indicate the existence of stated features, elements and/or components, but does not exclude the presence of one or more other features, elements, components and/or combinations thereof. In addition, when an expression such as "at least one of" appears before the list of listed features, it modifies the entire list of listed features, rather than just the individual elements in the list. In addition, when the embodiments of the present application are described, the use of "can" implies "one or more embodiments of the present application," and the term "exemplary" refers to an example or illustration. In general, terminology can be understood at least in part from usage in context. For example, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context It should be readily understood that the meaning of "on," "above," and "over" in the present disclosure should be interpreted in the broadest manner such that "on" not only means "directly on" something, but also includes the meaning of "on" something with an intermediate feature or a layer there between. Moreover, "above" or "over" not only means "above" or "over" something, but can also include the meaning it is "above" or "over" something with no intermediate feature or layer there between (i.e., directly on something).

Further, spatially relative terms, such as "beneath," "below," "lower," "above," "upper," and the like, can be used herein for ease of description to describe one element or feature's relationship to another element(s) or feature(s) as illustrated in the figures. The spatially relative terms are intended to encompass different orientations of the device in use or process step in addition to the orientation depicted in the figures. The apparatus can be otherwise oriented (rotated 90 degrees or at other orientations) and the spatially relative descriptors used herein can likewise be interpreted accordingly.

As used herein, the term "substrate" refers to a material onto which subsequent material layers are added. The substrate includes a "top" surface and a "bottom" surface. The top surface of the substrate is typically where a semiconductor device is formed, and therefore the semiconductor device is formed at a top side of the substrate unless stated otherwise. The bottom surface is opposite to the top surface and therefore a bottom side of the substrate is opposite to the top side of the substrate. The substrate itself can be patterned. Materials added on top of the substrate can be patterned or can remain unpatterned. Furthermore, the substrate can include a wide array of semiconductor materials, such as silicon, germanium, gallium arsenide, indium phosphide, for example. Alternatively, the substrate can be made from an electrically non-conductive material, such as a glass, a plastic, or a sapphire wafer. As used herein, the term "layer" refers to a material portion including a region with a thickness. A layer has a top side and a bottom side where the bottom side of the layer is relatively close to the substrate and the top side is relatively away from the substrate. A layer can extend over the entirety of an underlying or overlying structure, or can have an extent less than the extent of an underlying or overlying structure. Further, a layer can be a region of a homogeneous or inhomogeneous continuous structure that has a thickness less than the thickness of the continuous structure. For example, a layer can be located between any set of horizontal planes between, or at, a top surface and a bottom surface of the continuous structure. A layer can extend horizontally, vertically, and/or along a tapered surface. A substrate can be a layer, can include one or more layers therein, and/or can have one or more layer thereupon, there above, and/or there below. A layer can include multiple layers. For example, an interconnect layer can include one or more conductive and contact layers (in which contacts, interconnect lines, and/or vertical interconnect accesses (VIAs) are formed) and one or more dielectric layers.

In the present disclosure, for ease of description, "tier" is used to refer to elements of substantially the same height along the vertical direction. For example, a word line and the underlying gate dielectric layer can be referred to as "a tier," a word line and the underlying insulating layer can together be referred to as "a tier," word lines of substantially the same height can be referred to as "a tier of word lines" or similar, and so on.

As used herein, the term "nominal/nominally" refers to a desired, or target, value of a characteristic or parameter for a component or a process step, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

In the present disclosure, the term "horizontal/horizontally/lateral/laterally" means nominally parallel to a lateral surface of a substrate, and the term "vertical" or "vertically" means nominally perpendicular to the lateral surface of a substrate. In addition, in the present disclosure, when "connect" or "couple" is used, it can indicate that the corresponding components are in direct contact or indirect contact, unless otherwise clearly defined or it can be deduced from the context.

As used herein, the term "3D memory" refers to a three-dimensional (3D) semiconductor device with vertically oriented strings of memory cell transistors (referred to herein as "memory strings," such as NAND strings) on a laterally-oriented substrate so that the memory strings extend in the vertical direction with respect to the substrate.

The description is made herein with reference to schematic views of exemplary embodiments. The exemplary embodiments disclosed herein should not be construed as being limited to the specific shapes and sizes shown, but include various equivalent structures capable of realizing the same functions and deviations in shapes and sizes caused by, for example, manufacturing. The positions shown in the drawings are schematic in nature, and are not intended to limit the positions of the components.

Unless otherwise defined, all terminology (including technical and scientific terms) used herein has the same meanings as commonly understood by the ordinary person skilled in the art to which the present application belongs. It should also be understood that, unless explicitly stated in the present application, words defined in commonly used dictionaries should be interpreted as having meanings consistent with their meanings in the context of related art, and should not be interpreted in an idealized or overly formal sense. It needs to be noted that, in the case of no conflict, the embodiments in the present disclosure and the features in the embodiments can be combined with each other. In addition, unless clearly defined or contradictory to the context, the specific steps included in the method described in the present disclosure are not necessarily limited to the described order, and can be executed in any order or in parallel. The present disclosure will be described in detail below in conjunction with embodiments with reference to the drawings.

The structure and arrangement of some of the elements relevant to this application from a three dimensional memory are first being described. All interconnecting portions, array and peripheral bonding contacts, metal layers and array and peripheral wafer contact blocks connected to each other along a second direction perpendicular to a first direction are assigned the same number after the hyphen The first direction lies along the length of the TS to be tested. For example, in FIG. 1A, starting at the peripheral circuit 141-1, the structural elements, 143-1, BVIA-1, TVIA-1, 135-1, 133-1, 131-1 and 116-1 are all connected to each other vertically to form the first set of connections from the peripheral wafer to the array wafer and have been hyphenated with the number 1. This scheme of numbering is extended to the other sets of vertical connections between the structural elements of the array wafer and corresponding elements of the peripheral wafer as well. In some cases, it is desired to test or analyze the function of a test structure (TS) in the array wafer to improve the reliability of the TS to be tested. Another structure can be tested is the storage array, which comprises one or more 3D storage strings. Left and right ends of a word line to be tested in the storage array TS are each connected to one bonding contact in the array wafer. A bonding process can connect both test structures to be tested.

Prior to bonding, the bonding contact connected to one end of the TS is only connected to the word line to be tested in the TS, and is not connected to a well region. The bonding contact connected to the other connecting portion of the TS to be tested, in addition to being connected to the word line to be tested in the TS to be tested, is connected to a well region with a large amount of active electrons. This forms an unbalanced load with respect to the TS, and results in abnormal bonding in the subsequent bonding process. During the bonding process, the side of the bonding contact on the array wafer that is exposed to the surface of the wafer is chemically mechanically polished. Subsequently, the surface of the bonding contact is activated with charged ions and the wafer is cleaned with deionized water. Since the bonding contact is usually formed of copper, the bonding contacts can undergo an electrochemical reaction such as an electroplating reaction during the cleaning process. As a result, the metal on the bonding contacts dissolves, which leads to the occurrence of defects such as metal missing or metal voids in the contact blocks connected to the bonding contacts.

However, in the existing memory architecture and testing technology, prior to bonding, the circuit arrangement of the bonding contacts connected to the left end of the word line is different from that of the bonding contacts connected to the right end of the word line to be tested. At the wafer level, the resulting packaging failure, or compromised bonding reliability, contributes to low yielding wafers and associated economic losses. Therefore a need exists to create a memory architecture that presents a balanced load at the two ends of the word line to be tested.

According to the 3D memory of the present disclosure, two ends of the structure to be tested thereof are connected to corresponding test pins (Micro Pad) via peripheral wafer jumpers, respectively, and the two ends of the structure to be tested have symmetrical loads with respect to the structure to be tested. Such a balanced and symmetrical design can greatly reduce the influence of the electroplating reaction that can occur in the wafer bonding process on the connections of the wafer structure, avoiding the generation of metal voids, so that the bonding reliability can be improved.

Figure 1A:
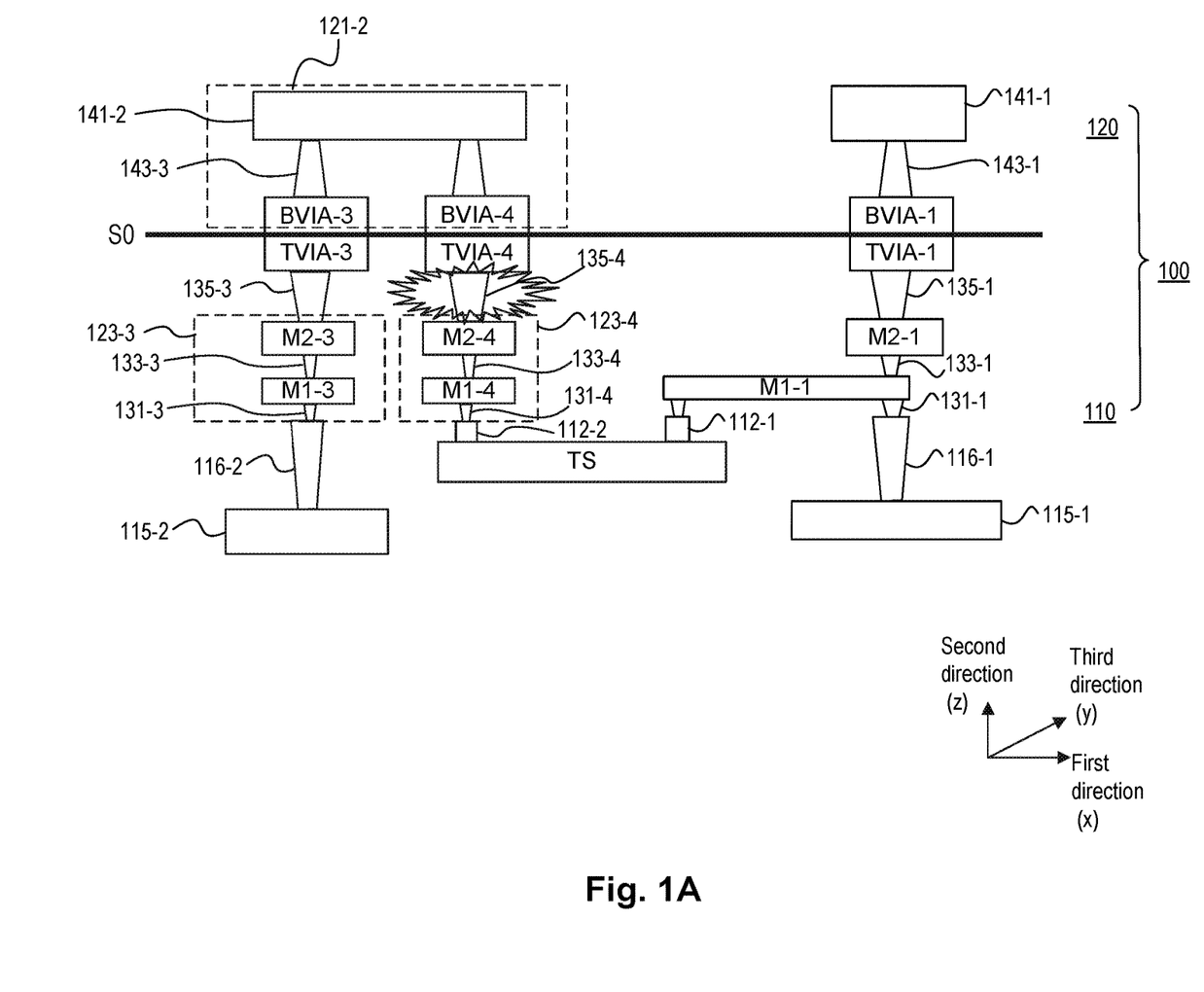
FIG. 1A shows a schematic structural view of an example of a 3D memory 100 with an unbalanced load at the two ends of the word line to be tested.
Figure 1B:
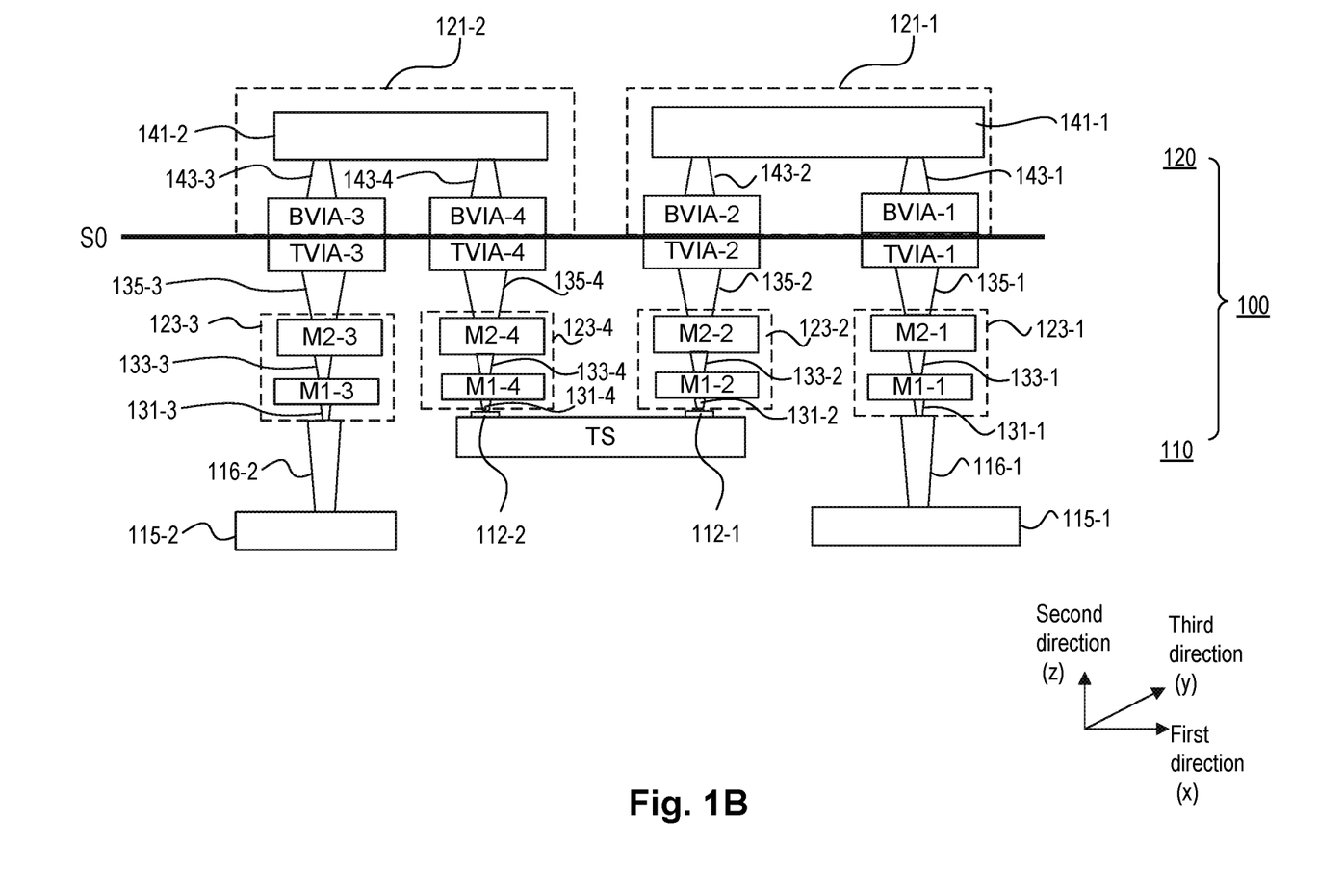
FIG. 1B shows a schematic structural view of an example of a 3D memory 100 according to an embodiment of the present disclosure.

FIGS. 1A and 1B will be combined below for comparison and description, wherein FIG. 1A shows a schematic structural view of an example of a 3D memory 100. Before an array wafer 110 is bonded to a peripheral wafer 120, a first connecting portion 112-1 of a test structure (TS) to be tested is connected to a first array wafer bonding contact TVIA-1 via a metal layer M1-1, a metal layer M2-1, and an array wafer contact blocks 135-1 and 133-1. The first connecting portion 112-1 is also connected to a first well region 115-1 via the metal layer M1-1, an array wafer contact block 131-1 and a first contact point 116-1.

A second connecting portion 112-2 is connected to a fourth array wafer bonding contact TVIA-4 using a fourth interconnecting portion 123-4 and an array wafer contact block 135-4 before the array wafer 110 is bonded to the peripheral wafer 120.

Before bonding, the second connecting portion 112-2 is not connected to a second well region 115-2. The fourth interconnecting portion 123-4 includes metal layers M1-4 and M2-4 connected by an array wafer contact block 133-4, and an array wafer contact block 131-4 that connects the metal layer M1-4 to the second connecting portion 112-2.

Therefore, in a 3D memory, the bonding contacts TVIA-1 and TVIA-4 that are connected to two ends of the TS to be tested, respectively, are different in circuit arrangements. For example, the bonding contact TVIA-4 is only connected to the TS to be tested, whereas the bonding contact TVIA-1, in addition to being connected to the TS to be tested, is connected to the well region 115-1 with a large number of active electrons.

During the bonding process, such an unbalanced load can lead to abnormal bonding. The side of the array wafer 110 with the bonding contact TVIA that is exposed to the surface of the wafer is chemically mechanically polished, after which the surface of the bonding contact TVIA is activated with charged ions and cleaned with deionized water. Since the material of the bonding contact TVIA is usually copper, the bonding contacts TVIA connected to the two ends of the TS to be tested can undergo an electrochemical reaction such as an electroplating reaction in the cleaning process.

Further, as shown in FIG. 1A, since the bonding contact TVIA-1 is connected to a P well with a large number of active electrons, it acts as a cathode in the electroplating reaction. However, the bonding contact TVIA-4 is not connected to the P well, and it acts as an anode in the electroplating reaction, which can lead to the dissolution of the metal on the bonding contact TVIA-4, and can result in the occurrence of defects such as metal missing or metal voids in the contact block 135-4 connected to the bonding contact TVIA-4.

FIG. 1B is a cross-sectional micrograph of a section of the memory in FIG. 1A after the array wafer 110 and the peripheral wafer 120 have been bonded, and therefore shows the fourth peripheral wafer bonding contact BVIA-4 bonded to the fourth array wafer bonding contact TVIA-4. Also, the micrograph in FIG. 1B shows the cross sectional view in the x-z plane compared to the memory cross-section in FIG. 1A and FIG. 1B, which are shown in the y-z plane. Metal voids in the array wafer bonding contacts and array wafer contact blocks can cause bonding reliability problems and subsequently packaging failures. At the wafer inspection stage in the 3D memory fabrication process, wafers with metal voids are treated as scrap and can cause associated economic losses.

To improve the bonding reliability by eliminating the metal voids formed by an unbalanced load on the TS to be tested, the current disclosure discloses an architecture of a 3D memory 100 with a balanced load configuration at the two ends of the test structure. FIG. 1B shows a schematic structural view of an example of a 3D memory 100 according to an embodiment of the present disclosure. Some elements of the 3D memory 100 in FIG. 1B are common to the elements in 3D memory 100 in FIG. 1A. The memory in FIG. 1B includes additional elements, which are a part of the new balanced load configuration. Please note that the elements included on the peripheral wafer 120, and the elements connecting the third array wafer bonding contact TVIA-3 to the well region 115-2 have been shown on FIG. 1A for correlation to the memory structure in FIG. 1B.

As shown in FIG. 1B, the 3D memory 100 can comprise an array wafer 110 and a peripheral wafer 120. The array wafer 110 and the peripheral wafer 120 can be bonded to each other, and their bonding interface is S0 as shown in the figure. The bonding interface S0 is parallel to the plane formed by two of the longer dimensions of the TS to be tested. Specifically, the peripheral wafer 120 can comprise a first peripheral structure 121-1 and a second peripheral structure 121-2. The array wafer 110 can comprise a substrate, and a TS to be tested and a plurality of interconnecting portions 123-1, 123-2, 123-3 and 123-4 located above the substrate. Further, the substrate can comprise a first well region 115-1 and a second well region 115-2 therein. It should be noted that, for the simplicity of illustration, FIG. 1B only schematically shows the relative position and connection relationships between the peripheral structures, the interconnecting portions, the structure to be tested and the well regions, but does not show the substrate and other specific structures. Moreover, the content shown in FIG. 1B is only an example and not a limitation.

The specific structures of the array wafer 110 will be further described below with reference to FIG. 1B. The TS to be tested has a first connecting portion 112-1 and a second connecting portion 112-2. According to an exemplary embodiment, the array wafer 110 can further include a plurality of 3D storage strings formed above the substrate, and the TS to be tested can be a 3D storage array comprising one or more 3D storage strings. In the present disclosure, for the convenience of description, the TS to be tested is represented in the form of a block diagram, and the specific arrangement thereof is omitted, but the schematic illustration is not intended to be limiting. In some embodiments, the 3D memory can comprise gate layers (word lines) and insulating layers that are alternately stacked on the substrate. Further, a plurality of channel structures (not shown) extending to the substrate are formed to penetrate the alternately stacked gate layers and insulating layers. The channel structure located in a core storage region of the 3D memory can be used as a 3D storage string. The TS to be tested can comprise a plurality of word lines connected to one or more 3D storage strings, and one of the plurality of word lines can be selected as a word line to be tested. In this embodiment, the first connecting portion 112-1 can comprise one end of the word line to be tested, and the second connecting portion 112-2 can comprise the other end of the word line to be tested. However, the present disclosure is not limited thereto. In another exemplary embodiment, the TS to be tested can comprise more than one word line to be tested.

The array wafer 110 can further include a plurality of interconnecting portions disposed on a side of the TS to be tested in the direction towards the bonding interface S0. For example, as shown in FIG. 1B, the array wafer 110 can comprise a first interconnecting portion 123-1, a second interconnecting portion 123-2 and a third interconnecting portion 123-3, as well as a fourth interconnecting portion 123-4. The first interconnecting portion 123-1 can electrically connect the first peripheral structure 121-1 and the first well region 115-1 located in the substrate of the array wafer 110. The second interconnecting portion 123-2 can electrically connect the first peripheral structure 121-1 and the first connecting portion 112-1 of the TS to be tested. The third interconnecting portion 123-3 can electrically connect the second peripheral structure 121-2 and the second well region 115-2 located in the substrate of the array wafer 110. The fourth interconnecting portion 123-4 can electrically connect the second peripheral structure 121-2 and the second connecting portion 112-2 of the TS to be tested.

Further, each of the first interconnecting portion 123-1 to the fourth interconnecting portion 123-4 can include at least one set of array wafer connecting blocks and array wafer conductor layers that are alternately stacked in a direction of the TS to be tested close to the peripheral wafer 120. The array wafer connecting blocks and the array wafer conductor layers can be arranged in a manner of array wafer connecting block 1-array wafer conductor layer 1-array wafer connecting block 2-array wafer conductor layer 2, . . . , -array wafer conductor layer n-array wafer connecting block n. For example, in an embodiment, the interconnecting portions can each comprise a set of array wafer connecting block and array wafer conductor layer. Specifically, the first interconnecting portion 123-1 can comprise an array wafer connecting block 131-1 and an array wafer conductor layer M1-1 that are sequentially stacked in the direction of the TS to be tested close to the peripheral wafer 120. The second interconnecting portion 123-2 can comprise an array wafer connecting block 131-2 and an array wafer conductor layer M1-2 that are sequentially stacked in the direction of the TS to be tested close to the peripheral wafer 120. The third interconnecting portion 123-3 can comprise an array wafer connecting block 131-3 and an array wafer conductor layer M1-3 that are sequentially stacked in the direction of the TS to be tested close to the peripheral wafer 120. The fourth interconnecting portion 123-4 can comprise an array wafer connecting block 131-4 and an array wafer conductor layer M1-4 that are sequentially stacked in the direction of the TS to be tested close to the peripheral wafer 120. The connecting blocks (for example, the array wafer connecting blocks 131-1 to 131-4, and 133-1 to 133-4) in the array wafer 110 can be contact holes and/or contact trenches (for example, which are formed by means of a wet etching process or a dry etching process) filled with a conductor (for example, tungsten). In some embodiments, filling in the contact holes and/or contact trenches comprises depositing a barrier layer, an adhesive layer, and/or a seed layer before depositing the conductor.

In another embodiment, each of the first interconnecting portion 123-1 to the fourth interconnecting portion 123-4 can comprise two sets of array wafer connecting blocks and array wafer conductor layers. Specifically, as shown in FIG. 1B, the first interconnecting portion 123-1 can comprise an array wafer connecting block 131-1, an array wafer conductor layer M1-1, an array wafer connecting block 133-1 and an array wafer conductor layer M2-1 that are sequentially stacked perpendicular to the length of the TS to be tested close to the peripheral wafer 120. The second interconnecting portion 123-2 can include an array wafer connecting block 131-2, an array wafer conductor layer M1-2, an array wafer connecting block 133-2 and an array wafer conductor layer M2-2 that are sequentially stacked perpendicular to the length of the TS to be tested close to the peripheral wafer 120. The third interconnecting portion 123-3 can comprise an array wafer connecting block 131-3, an array wafer conductor layer M1-3, an array wafer connecting block 133-3 and an array wafer conductor layer M2-3 that are sequentially stacked perpendicular to the length of the TS to be tested close to the peripheral wafer 120. The fourth interconnecting portion 123-4 can comprise an array wafer connecting block 131-4, an array wafer conductor layer M1-4, an array wafer connecting block 133-4 and an array wafer conductor layer M2-4 that are sequentially stacked perpendicular to the length of the TS to be tested close to the peripheral wafer 120. The conductor layers (for example, the array wafer conductor layers M1-1 to M1-4, and the array wafer sub-conductor layers M2-1 to M2-4) in the array wafer 110 can comprise a conductor material, which includes but is not limited to tungsten (W), cobalt (Co), copper (Cu), aluminum (Al), silicide, or any combination thereof, as would also become apparent to a person skilled in the art.

In an embodiment according to the present disclosure, the array wafer 110 can further include a plurality of array wafer bonding contacts TVIA, which are located at a contact surface of the array wafer 110 close to the peripheral wafer 120; and a plurality of array wafer contact blocks (such as 135-1 to 135-4 in FIG. 1B), which are used to electrically connect the interconnecting portions and the array wafer bonding contacts TVIA, respectively. More specifically, an array wafer contact block, for example, can electrically connect an array wafer conductor layer M on a side close to the peripheral wafer 120 included in an interconnecting portion and an array wafer bonding contact TVIA. Referring to FIG. 1B, for example, an array wafer conductor layer M2-1 in the first interconnecting portion 123-1 is electrically connected to a first array wafer bonding contact TVIA-1 through the array wafer contact block 135-1; an array wafer conductor layer M2-2 in the second interconnecting portion 123-2 is electrically connected to a second array wafer bonding contact TVIA-2 through the array wafer contact block 135-2; an array wafer conductor layer M2-3 in the third interconnecting portion 123-3 is electrically connected to a third array wafer bonding contact TVIA-3 through the array wafer contact block 135-3; and an array wafer conductor layer M2-4 in the second interconnecting portion 123-4 is electrically connected to a fourth array wafer bonding contact TVIA-4 through the array wafer contact block 135-4. It needs to be understood that the content shown in FIG. 1B is only an example and not a limitation. In other embodiments, the array wafer conductor layer M1 or M2 can also comprise a plurality of metal contact points. The plurality of metal contact points on M2 can correspond to a plurality of array wafer contact blocks and then can be correspondingly connected to a plurality of array wafer bonding contacts.

The materials of the contact blocks (for example, the array wafer contact blocks 135-1 to 135-4) and the bonding contacts (for example, the array wafer bonding contacts TVIA-1 to TVIA-4) in the array wafer 110 can be copper, but the present disclosure is not limited thereto. For example, in other embodiments, the contact blocks and the bonding contacts in the array wafer 110 can be formed of a material such as aluminum (Al) or tin (Sn). The contact blocks can be contact holes and/or contact trenches (for example, which are formed by means of a wet etching process or a dry etching process) filled with a conductor (for example, tungsten). The bonding contacts can be formed using the same process as the contact block, but can have a larger area relative to the contact blocks on a cross-section parallel to the bonding interface, so as to form a better contact during bonding. In some embodiments, filling in the contact holes and/or contact trenches comprises depositing a barrier layer, an adhesive layer, and/or a seed layer before depositing the conductor as would also become apparent to a person skilled in the art.

In an embodiment according to the present disclosure, the second interconnecting portion 123-2 and the fourth interconnecting portion 123-4 can have the same structural arrangement. For example, the second interconnecting portion 123-2 and the fourth interconnecting portion 123-4 can have the same number and regular arrangement of stacked structures, which can be formed by means of alternately stacking array wafer connecting blocks and array wafer conductor layers. Specifically, as shown in FIG. 1B, the second interconnecting portion 123-2 and the fourth interconnecting portion 123-4 each have two sets of array wafer connecting blocks (131-2, 133-2, 131-4 and 133-4 as shown in the figure) and array wafer conductor layers (M1-2, M2-2, M1-4 and M2-4 as shown in the figure) that are stacked alternately, and they are each arranged according to a regular pattern of array wafer connecting block-array wafer conductor layer-array wafer connecting block-array wafer conductor layer. The elements comprising the second interconnecting portions 123-2 and the fourth interconnecting portion 123-2 are the same in number and structure to configure a symmetrical and balanced load at the two connecting portions of the TS to be tested.

Further, in an embodiment according to the present disclosure, the second interconnecting portion 123-2 and the fourth interconnecting portion 123-4 are each electrically connected to an array wafer bonding contact through the same number and structure of array wafer contact blocks. For example, the second interconnecting portion 123-2 is electrically connected to the second array wafer bonding contact TVIA-2 through an array wafer contact block 135-2, and the fourth interconnecting portion 123-4 is also electrically connected to the fourth array wafer bonding contact TVIA-4 through an array wafer contact block 135-4, wherein the array wafer contact block 135-2 and the array wafer contact block 135-4 have the same structure.

In combination with the foregoing, when the array wafer 110 and the peripheral wafer 120 are not bonded to each other, the first connecting portion 112-1 of the TS to be tested is electrically connected to the second array wafer bonding contact TVIA-2 through the second interconnecting portion 123-2 and the array wafer contact block 135-2, and the second connecting portion 112-2 of the TS to be tested is electrically connected to the fourth array wafer bonding contact TVIA-4 through the fourth interconnecting portion 123-4 and the array wafer contact block 135-4. The second interconnecting portion 123-2 and the fourth interconnecting portion 123-4 can have the same structural arrangement, and the array wafer contact block 135-2 and the array wafer contact block 135-4 can also have the same structure.

According to the above embodiments disclosed in the present disclosure, it can be seen in combination with FIG. 1B and the foregoing description that the second interconnecting portion 123-2 and the array wafer contact block 135-2 as well as the second array wafer bonding contact TVIA-2 are disposed so that before the bonding process, the circuit components respectively connected to the first connecting portion 112-1 and the second connecting portion 112-2 of the TS to be tested have substantially the same structure correspondingly to each other. As a result, the first connecting portion 112-1 and the second connecting portion 112-2 of the TS to be tested have a balanced and symmetrical load with respect to the TS to be tested. Moreover, before the bonding process, since the array wafer 110 and the peripheral wafer 120 are not yet bonded to each other, the two are in a state of being separated from each other. Therefore, the first connecting portion 112-1 of the TS to be tested passes through the array wafer bonding contact TVIA-2 connected to the second interconnecting portion 123-2 but is not connected to the first peripheral structure 121-1, and therefore is not connected to the first well region 115-1. Similarly, the second connecting portion 112-2 of the TS to be tested passes through the array wafer bonding contact TVIA-4 connected to the fourth interconnecting portion 123-4 but is not connected to the second peripheral structure 121-2, and therefore is not connected to the second well region 115-2. That is, before the bonding process, both the first connecting portion 112-1 and the second connecting portion 112-2 of the TS to be tested are not connected to the well region, and the two have the same circuit arrangement. Such a balanced and symmetrical design can greatly reduce the influence of the electroplating reaction that can occur in the wafer bonding process on the connections of the wafer structure, and can effectively avoid the generation of metal voids, and can greatly improving the reliability of the bonding.

The specific structures of the first peripheral structure 121-1 and the second peripheral structure 121-2 in the peripheral wafer 120 will be further described below with reference to FIG. 1B.

The first peripheral structure 121-1 can comprise a first peripheral wafer bonding contact BVIA-1 and a second peripheral wafer bonding contact BVIA-2, both of which can be located at a contact surface of the peripheral wafer 120 close to the array wafer 110, wherein the first peripheral wafer bonding contact BVIA-1 can be electrically connected to the first array wafer bonding contact TVIA-1 electrically connected to the first interconnecting portion 123-1, and then electrically connected to the first well region 115-1 through the first interconnecting portion 123-1; and the second peripheral wafer bonding contact BVIA-2 can be electrically connected to the second array wafer bonding contact TVIA-2 electrically connected to the second interconnecting portion 123-2, and then electrically connected to the first connecting portion 112-1 of the TS to be tested through the second interconnecting portion 123-2.

Further, the first peripheral structure 121-1 can also comprise a first peripheral circuit 141-1, which is disposed on the side of the substrate (not shown) of the peripheral wafer 120 facing the bonding interface S0, and can be configured to provide a control signal with respect to the first connecting portion 112-1 of the TS to be tested in a non-test state so as to control the operation of the TS to be tested. In a test state, the first peripheral circuit 141-1 can be in a floating state. At this time, an external test signal with respect to the TS to be tested is received from the outside via a first test pin, as will be described in detail below. The first peripheral structure 121-1 can further comprise a first peripheral wafer contact block 143-1 and a second peripheral wafer contact block 143-2, both of which can be located in the direction perpendicular to the length of the TS to be tested and spatially close to the array wafer 110, and are used to electrically connect the first peripheral circuit 141-1 to the first peripheral wafer bonding contact BVIA-1 and the second peripheral wafer bonding contact BVIA-2, respectively.

Similar to the first peripheral structure 121-1, the second peripheral structure 121-2 can comprise a third peripheral wafer bonding contact BVIA-3 and a fourth peripheral wafer bonding contact BVIA-4, both of which can be located at the contact surface of the peripheral wafer 120 close to the array wafer 110. The third peripheral wafer bonding contact BVIA-3 can be electrically connected to the third array wafer bonding contact TVIA-3 that is electrically connected to the third interconnecting portion 123-3, and then electrically connected to the second well region 115-2 through the third interconnecting portion 123-2. The fourth peripheral wafer bonding contact BVIA-4 can be electrically connected to the fourth array wafer bonding contact TVIA-4 that is electrically connected to the fourth interconnecting portion 123-4, and then electrically connected to the second connecting portion 112-2 of the TS to be tested through the fourth interconnecting portion 123-4.

Further, the second peripheral structure 121-2 can comprise a second peripheral circuit 141-2, which is disposed on the side of the substrate (not shown) of the peripheral wafer 120 facing the bonding interface S0, and can be configured to provide a control signal with respect to the second connecting portion 112-2 of the TS to be tested in the non-test state so as to control the operation of the TS to be tested. It should be understood that in the non-testing state, there can be cases where only one peripheral circuit is used to provide the control signal with respect to the TS to be tested. For example, in an embodiment, the second peripheral structure 121-2 can comprise a second peripheral circuit 141-2, and the first peripheral structure 121-1 can comprise the peripheral circuit 141-1s and only for example, a metal conductor layer as a conductive path. In the test state, the second peripheral circuit 141-2 can be in a floating state. At this time, an external test signal with respect to the TS to be tested is received from the outside via a second test pin, as will be described in detail below. The second peripheral structure 121-2 can further comprise a third peripheral wafer contact block 143-3 and a fourth peripheral wafer contact block 143-4, both of which can be located in a direction of the second peripheral circuit 141-2 close to the array wafer 110, and are used to electrically connect the second peripheral circuit 141-2 to the third peripheral wafer bonding contact BVIA-3 and the fourth peripheral wafer bonding contact BVIA-4, respectively.

In an embodiment according to the present disclosure, the materials of the contact blocks (for example, the peripheral wafer contact blocks 143-1 to 143-4) and the bonding contacts (for example, the peripheral wafer bonding contacts BVIA-1 to BVIA-4) in the peripheral wafer 120 can be copper, but the present disclosure is not limited thereto. For example, in other embodiments, the contact blocks and the bonding contacts in the peripheral wafer 120 can be formed of a material such as Al or Sn. The contact blocks in the peripheral wafer 120 can be contact holes and/or contact trenches filled with a conductor (for example, tungsten) (for example, which are formed by means of a wet etching process or a dry etching process). The bonding contacts in the peripheral wafer 120 can be formed using the same process as the contact blocks, but can have a larger area relative to the contact blocks on the cross-section parallel to the bonding interface, so as to form a better contact during bonding. In some embodiments, filling in the contact holes and/or contact trenches comprises depositing a barrier layer, an adhesive layer, and/or a seed layer before depositing the conductor as would also become apparent to a person skilled in the art.

Refer to FIG. 1B, according to an embodiment of the present disclosure, the array wafer 110 can further comprise a first contact point 116-1, the first contact point 116-1 can be located on a side of the first well region 115-1 close to the peripheral wafer 120, and the first contact point 116-1 can electrically connect the first well region 115-1 and the first interconnecting portion 123-1. The first well region 115-1 can be a doped region disposed on a side (not shown) of the substrate close to the bonding interface S0. In an embodiment, the first well region 115-1 can be a P-type doped region, which can be a region formed by using any suitable P-type dopant (for example, boron (B), gallium (Ga) or aluminum (Al)) to dope into an N-type semiconductor as a substrate, namely, a P well, as would become apparent to a person skilled in the art. However, the present disclosure is not limited thereto. In another embodiment, the first well region 115-1 can be a region formed by using any suitable N-type dopant (for example, phosphorus (P), arsenic (Ar), or antimony (Sb)) to dope into a P-type semiconductor as a substrate, namely, an N well, as would also become apparent to a person skilled in the art.

In another embodiment of the present disclosure, the array wafer 110 can further comprise a second contact point 116-2, the second contact point 116-2 can be located on a side of the second well region 115-2 close to the peripheral wafer 120, and the second contact point 116-2 can electrically connect the second well region 115-2 and the third interconnecting portion 123-3. The second well region 115-2 can be formed by the same process as the first well region 115-1. That is, in a case where the first well region 115-1 is a P well that is disposed in an N-type substrate, the second well region 115-2 is also a P well, and where the first well region is an N well that is disposed in a P-type substrate, the second well region 115-2 is also an N well.

The first peripheral wafer bonding contact BVIA-1 can be electrically connected to the first interconnecting portion 123-1 through the first array wafer bonding contact TVIA-1. Specifically, the first array wafer bonding contact TVIA-1 in the array wafer 110 can be exposed from the side of the array wafer 110 facing the bonding interface S0, and can be electrically connected to the first peripheral wafer bonding contact BVIA-1 in the first peripheral structure 121-1 by means of a bonding process. The array wafer connecting block 131-1 in the first interconnecting portion 123-1 is electrically connected to the first contact point 116-1, and then electrically connected to a first test pin (not shown in the figure).

Furthermore, in an embodiment, a first test pin (not shown), which is used for receiving an external test signal applied to an end of the word line to be tested at the first connecting portion 112-1, can be disposed on a surface of the substrate below the first well region 115-1 on a side facing away from the bonding interface S0. The first test pin can be connected to the first contact point 116-1 through a first contact structure (not shown) that penetrates the first well region 115-1 and the substrate below it. Similarly, the second peripheral wafer bonding contact BVIA-2 can be electrically connected to the second interconnecting portion 123-2 through the second array wafer bonding contact TVIA-2, and the array wafer bonding contact TVIA-2 in the array wafer 110 can also be exposed from a side of the array wafer 110 facing the bonding interface S0, and can be electrically connected to the second peripheral wafer bonding contact BVIA-2 in the first peripheral structure 121-1 by means of a bonding process.

In an embodiment, at one end of the second interconnecting portion 123-2 close to the TS to be tested, the second interconnecting portion 123-2 can be electrically connected to the first connecting portion 112-1 of the TS to be tested through the array wafer connecting block 131-2 included therein. As a result, an electrical connection path going from the first test pin through the first well region 115-1, the first interconnecting portion 123-1, the first peripheral structure 121-1, and the second interconnecting portion 123-2 in sequence to the first connecting portion 112-1 of the TS to be tested is formed. In this way, in the test state, an external test signal with respect to one end (for example, one end included in the first connecting portion 112-1) of the word line to be tested in the TS to be tested can be received from the outside via the first test pin.

It should be noted that, in the test state, the signal applied to one end of the word line to be tested at the first connecting portion 112-1 of the TS to be tested is an external test signal received by means of the first test pin. Moreover, at this time, the first peripheral circuit 141-1 connected to the first connecting portion 112-1 can be in a floating state. That is, in this case, the first peripheral circuit 141-1 can be regarded as only playing a function of conductively connecting the interconnecting portion 123-1 and the second interconnecting portion 123-2, for example. In the present disclosure, in order to simplify the schematic structure and related description, the first test pin and the first contact structure are not shown in the drawings.

In an embodiment, the third peripheral wafer bonding contact BVIA-3 can be electrically connected to the third interconnecting portion 123-3 through the array wafer bonding contact TVIA-3 in the array wafer 110. Specifically, the array wafer bonding contact TVIA-3 can be exposed from the side of the array wafer 110 facing the bonding interface S0, and can be electrically connected to the third peripheral wafer bonding contact BVIA-3 in the second peripheral structure 121-2 by means of a bonding process. The array wafer connecting block 131-3 in the third interconnecting portion 123-3 is electrically connected to the second contact point 116-2, and then electrically connected to a second test pin (not shown in the figure).

Furthermore, in some embodiments, a second test pin (not shown), which is used for receiving an external test signal applied to the other end of the word line to be tested at the second connecting portion 112-2, can be disposed on a surface of the substrate below the second well region 115-2 on a side facing away from the bonding interface S0. The second test pin can be connected to the second contact point 116-2 through a second contact structure (not shown) that penetrates the second well region 115-2 and the substrate below it. Similarly, the fourth peripheral wafer bonding contact BVIA-4 can be electrically connected to the fourth interconnecting portion 123-4 through the array wafer bonding contact TVIA-4 in the array wafer 110. The array wafer bonding contact TVIA-4 in the array wafer 110 can also be exposed from the side of the array wafer 110 facing the bonding interface S0, and can be electrically connected to the fourth peripheral wafer bonding contact BVIA-4 in the second peripheral structure 121-2 by means of a bonding process.

In an embodiment, at one end of the fourth interconnecting portion 123-4 close to the TS to be tested, the fourth interconnecting portion 123-4 can be electrically connected to the second connecting portion 112-2 of the TS to be tested through the array wafer connecting block 131-4. As a result, an electrical connection path from the second test pin through the second well region 115-2, the third interconnecting portion 123-3, the second peripheral structure 121-2, and the fourth interconnecting portion 123-4 in sequence to the second connecting portion 112-2 of the TS to be tested is formed. In this way, in the test state, an external test signal with respect to the other end (for example, one end included in the second connecting portion 112-2) of the word line to be tested in the TS to be tested can be received from the outside via the second test pin.

In an embodiment, in the test state, the signal applied to one end of the word line to be tested at the second connecting portion 112-2 of the TS to be tested is an external test signal received by means of the second test pin. Moreover, at this time, the second peripheral circuit 141-2 connected to the second connecting portion 112-2 can be in a floating state. That is, in this case, the second peripheral circuit 141-2 can be regarded as only playing a function of conductive connection (for example, conductively connecting the interconnecting portion 123-3 and the second interconnecting portion 123-4). In the present disclosure, in order to simplify the schematic structure and related description, the second test pin and the second contact structure are not shown in the drawings.

After the bonding process, the first connecting portion 112-1 of the TS to be tested is connected to the first test pin via the second interconnecting portion 123-2, the first peripheral structure 121-1, the first interconnecting portion 123-1, and the first well region 115-1 in sequence. The second connecting portion 112-2 of the TS to be tested is connected to the second test pin via the fourth interconnecting portion 123-4, the second peripheral structure 121-2, the third interconnecting portion 123-3 and the second well region 115-2 in sequence.

The conductive path formed by the second interconnecting portion 123-2 in the array wafer, the first peripheral structure 121-1 in the peripheral wafer and the first interconnecting portion 123-1 in the array wafer can be regarded as a first set of jumper structures. Similarly, the conductive path formed by the fourth interconnecting portion 123-4 in the array wafer, the second peripheral structure 121-2 in the peripheral wafer, and the third interconnecting portion 123-3 in the array wafer can be regarded as a second set of jumper structures. After the bonding process, the two connecting portions of the TS to be tested form two sets of jumper structures that are symmetrical with respect to the TS to be tested. The interconnecting structure in the array wafer and the peripheral structure in the peripheral wafer that are disposed symmetrically. This ensures that the two connecting portions of the TS to be tested are connected to the corresponding test pins by means of the symmetrical jumper structures formed at the two ends, respectively.

However, before the bonding process, the first connecting portion 112-1 and the second connecting portion 112-2 of the TS to be tested have a balanced and symmetrical load with respect to the TS to be tested. Neither of the first connecting portion 112-1 and the second connecting portion 112-2 of the TS to be tested is connected to the well regions. Thus, both connecting portions have the same circuit environment. Such a balanced and symmetrical design can greatly reduce the influence of the electroplating reaction that can occur during the wafer bonding process on the connections of the wafer structure. This arrangement improves the reliability of the bonding and ensures the performance and quality of the 3D memory.

In an embodiment, the word lines of the TS to be tested can be arranged symmetrically with respect to the structure to be tested. Therefore, it will be understood by the person skilled in the art that the signals applied to the first connecting portion 112-1 and the second connecting portion 112-2 (i.e., both ends of the word line) of the TS to be tested can be the same signal. For example, in the test state, the external test signals applied to the two ends of the word line are provided by the first test pin and the second test pin. The test signal provided by the first and the second test pin can be the same. In the non-test state, the control signals applied to the two ends of the word line are provided by the first peripheral circuit 141-1 and the second peripheral circuit 141-2. Since the first peripheral circuit 141-1 and the second peripheral circuit 141-2 can have the same configuration, the control signal applied to the two ends of the word line can be the same.

In an embodiment, the first peripheral circuit 141-1 and the second peripheral circuit 141-2 can comprise a peripheral wafer device that can generate any appropriate digital, analog, and/or mixed signal to facilitate the operation of the 3D memory 100. For example, the peripheral wafer device can comprise one or more of a page buffer, a decoder (for example, a row decoder and a column decoder), a read-out amplifier, a driver, a charge pump, a current or voltage reference, and any active or passive component (for example, a transistor, a diode, a resistor, or a capacitor) of a circuit.

In an embodiment, the first peripheral circuit 141-1 and the second peripheral circuit 141-2 can be a driver circuit for generating an input signal for the TS to be tested. For example, the first peripheral circuit 141-1 can be a first driver circuit connectable to one end of the word line of the TS to be tested, and the second peripheral circuit 141-2 can be a second driver circuit connectable to the other end of the word line of the structure to be tested. In a general case, since the first peripheral circuit 141-1 and the second peripheral circuit 141-2 are connected to both ends of the word line, the first peripheral circuit 141-1 and the second peripheral circuit 141-2 can have the same configuration.

In summary, in the 3D memory according to embodiments of the present disclosure, the circuit environments of the loads (for example, the array wafer bonding contacts TVIA) respectively connected to the two connecting portions of the TS to be tested have a symmetrical design with respect to the TS to be tested. Such a symmetrical design reduces the influence of the electroplating reaction that can occur during the wafer bonding process on the connections of the wafer structure, which can effectively avoid the generation of metal voids (such as copper voids) and improve the bonding reliability.

It should be understood by the person skilled in the art that the scope of protection involved in the present disclosure is not limited to technical solutions formed by specific combinations of the above technical features. At the same time, persons skilled in the art should envision other technical solutions formed by combinations of the above technical features or equivalent features thereof without departing from the disclosed technical concepts. For example, the above features and (but not limited to) the technical features with similar functions disclosed in the present application are replaced with each other to form technical solutions.

Figure 2A:
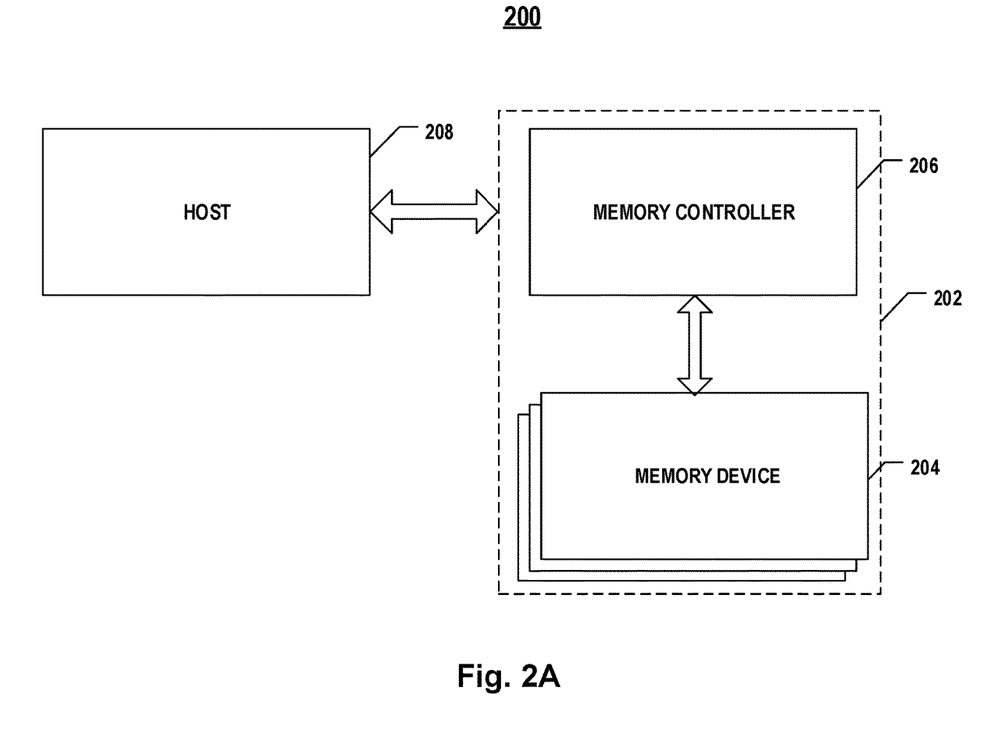
FIG. 2A illustrates a block diagram of an exemplary system having a memory device, according to some aspects of the present disclosure.

FIG. 2A illustrates a block diagram of an exemplary system 200 having a memory device, according to some aspects of the present disclosure. System 200 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 2A, system 200 can include a host 208 and a memory system 202 having one or more memory devices 204 and a memory controller 206. Host 208 can be a processor of an electronic device, such as a central processing unit (CPU), or a system-on-chip (SoC), such as an application processor (AP). Host 208 can be configured to send or receive data to or from memory devices 204.

Memory device 204 can be any memory device disclosed in the present disclosure, such as the 3D memory described in this disclosure. The 3D memory can be a NAND memory (i.e., "flash," "NAND flash" or "NAND").

Memory controller 206 is coupled to memory device 204 and host 208 and is configured to control memory device 204, according to some implementations. Memory controller 206 can manage the data stored in memory device 204 and communicate with host 208. In some implementations, memory controller 206 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 206 is designed for operating in a high duty-cycle environment SSDs or embedded multi-media-cards (eMMCs) used as data storage for mobile devices, such as smartphones, tablets, laptop computers, etc., and enterprise storage arrays. Memory controller 206 can be configured to control operations of memory device 204, such as read, erase, and program operations. In some implementations, memory controller 206 is configured to connect with one or more 3D memory devices. In some embodiments, each memory device 204 can be managed by the memory controller 206.

Memory controller 206 can also be configured to manage various functions with respect to the data stored or to be stored in memory device 204 including, but not limited to bad-block management, garbage collection, logical-to-physical address conversion, wear leveling, etc. In some implementations, memory controller 206 is further configured to process error correction codes (ECCs) with respect to the data read from or written to memory device 204. Any other suitable functions may be performed by memory controller 206 as well, for example, formatting memory device 204. Memory controller 206 can communicate with an external device (e.g., host 208) according to a particular communication protocol. For example, memory controller 206 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2B:
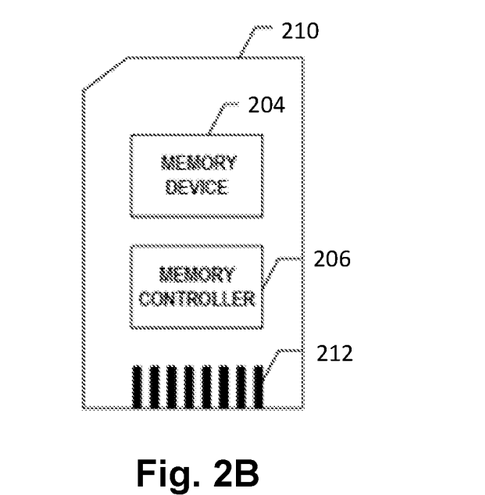
FIG. 2B illustrates a diagram of an exemplary memory card having a memory device, according to some aspects of the present disclosure.
Figure 2C:
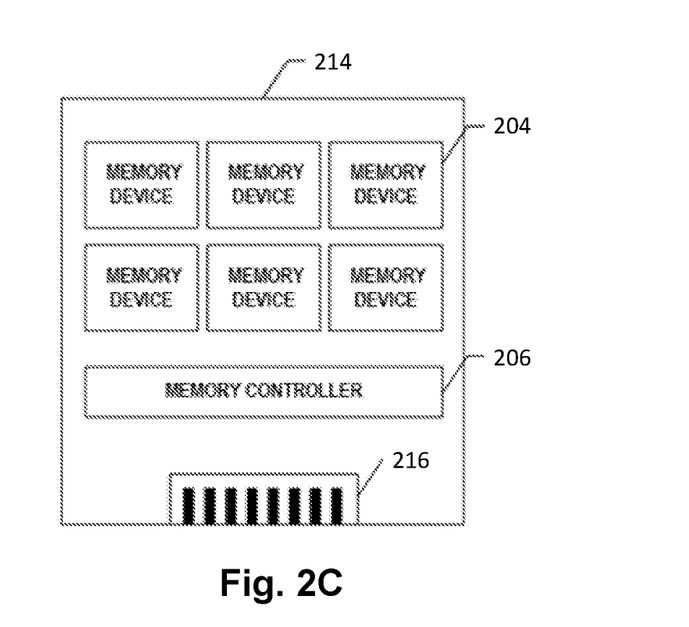
FIG. 2C illustrates a diagram of an exemplary solid-state drive (SSD) having a memory device, according to some aspects of the present disclosure.

Memory controller 206 and one or more memory devices 204 can be integrated into various types of storage devices, for example, be included in the same package, such as a universal Flash storage (UFS) package or an eMMC package. That is, memory system 202 can be implemented and packaged into different types of end electronic products. In one example as shown in FIG. 2B, memory controller 206 and a single memory device 204 may be integrated into a memory card 210. Memory card 210 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 210 can further include a memory card connector 212 configured to couple memory card 210 to a host (e.g., host 208 in FIG. 2A). In another example as shown in FIG. 2C, memory controller 206 and multiple memory devices 204 may be integrated into an SSD 214. SSD 214 can further include an SSD connector 216 configured to couple SSD 214 to a host (e.g., host 208 in FIG. 2A). In some implementations, the storage capacity and/or the operation speed of SSD 214 is greater than those of memory card 210.

What is claimed is:

1. A 3D memory device, comprising a peripheral wafer and an array wafer, wherein,
the peripheral wafer comprises a first peripheral structure and a second peripheral structure; and
the array wafer comprises a substrate, and a structure to be tested and a plurality of interconnecting portions on the substrate, wherein the substrate comprises a first well region and a second well region, wherein the structure to be tested comprises a first connecting end and a second connecting end, and wherein the plurality of interconnecting portions comprise:
a first interconnecting portion, which electrically connects the first peripheral structure and the first well region;
a second interconnecting portion, which electrically connects the first peripheral structure and the first connecting end of the structure to be tested;
a third interconnecting portion, which electrically connects the second peripheral structure and the second well region; and
a fourth interconnecting portion, which electrically connects the second peripheral structure and the second connecting end of the structure to be tested.

2. The 3D memory device of claim 1, wherein, the structure to be tested comprises word lines of memory array, and the first connecting end and the second connecting end connect with the word lines respectively.

3. The 3D memory device of claim 1, wherein,
each of the plurality of interconnecting portions comprises at least one group of alternatively arranged array wafer connecting blocks and array wafer conductor layers; and
the array wafer further comprises a plurality of array wafer bonding contacts, and
a plurality of array wafer contact blocks, which are used respectively to electrically connect the interconnecting portions and the array wafer bonding contact.

4. The 3D memory device of claim 3, wherein, the second interconnecting portion and the fourth interconnecting portion comprise the same number of the array wafer conductor layers and the same number of the array wafer connecting blocks.

5. The 3D memory device of claim 3, wherein, the first peripheral structure comprises a first peripheral wafer bonding contact and a second peripheral wafer bonding contact located at a contact surface of the peripheral wafer close to the array wafer, wherein,
the first peripheral wafer bonding contact is electrically connected to an array wafer bonding contact of the plurality of array wafer bonding contacts, and wherein the array wafer bonding contact is electrically connected to the first interconnecting portion; and
the second peripheral wafer bonding contact is electrically connected to the array wafer bonding contact, and wherein the array wafer bonding contact is electrically connected to the second interconnecting portion.

6. The 3D memory device of claim 5, wherein, the first peripheral structure further comprises:
a first peripheral circuit; and
a first peripheral wafer contact block and a second peripheral wafer contact block, wherein,
the first peripheral wafer contact block electrically connects the first peripheral circuit to the first peripheral wafer bonding contact; and
the second peripheral wafer contact block electrically connects the first peripheral circuit to the second peripheral wafer bonding contact.

7. The 3D memory device of claim 3, wherein, the array wafer further comprises a first contact, wherein the first contact electrically connects the first well region to the first interconnecting portion.

8. The 3D memory device of claim 3, wherein, the second peripheral structure comprises a third peripheral wafer bonding contact and a fourth peripheral wafer bonding contact located at a contact surface of the peripheral wafer close to the array wafer, wherein, the third peripheral wafer bonding contact is electrically connected to an array wafer bonding contact of the plurality of array wafer bonding contacts, and wherein the array wafer bonding contact is electrically connected to the third interconnecting portion; and the fourth peripheral wafer bonding contact is electrically connected to the array wafer bonding contact, and wherein the array wafer bonding contact is electrically connected to the fourth interconnecting portion.

9. The 3D memory device of claim 8, wherein, the second peripheral structure further comprises:

a second peripheral circuit; and a third peripheral wafer contact block and a fourth wafer contact block, wherein, the third peripheral wafer contact block electrically connects the second peripheral circuit to the third peripheral wafer bonding contact; and the fourth peripheral wafer contact block electrically connects the second peripheral circuit to the fourth peripheral wafer bonding contact.

10. The 3D memory device of claim 3, wherein, the array wafer further comprises a second contact, wherein the second contact electrically connects the second well region to the third interconnecting portion.

11. A 3D memory system, comprising:

a 3D memory device configured to store data, and comprising:

a peripheral wafer comprising a first peripheral structure and a second peripheral structure; and an array wafer comprising:

a substrate, and a structure to be tested and a plurality of interconnecting portions on the substrate, wherein the substrate comprises a first well region and a second well region, wherein the structure to be tested comprises a first connecting end and a second connecting end, and wherein the plurality of interconnecting portions comprise:

a first interconnecting portion, which electrically connects the first peripheral structure and the first well region;

a second interconnecting portion, which electrically connects the first peripheral structure and the first connecting end of the structure to be tested;

a third interconnecting portion, which electrically connects the second peripheral structure and the second well region; and a fourth interconnecting portion, which electrically connects the second peripheral structure and the second connecting end of the structure to be tested; and a memory controller coupled to the 3D memory device and configured to control the 3D memory device.

12. The 3D memory system of claim 11, wherein, the structure to be tested comprises word lines of memory array, and the first connecting end and the second connecting end connect with the word lines respectively.

13. The 3D memory system of claim 11, wherein, each of the plurality of interconnecting portions comprises at least one group of alternatively arranged array wafer connecting blocks and array wafer conductor layers; and the array wafer further comprises a plurality of array wafer bonding contacts, and a plurality of array wafer contact blocks, which are used respectively to electrically connect the interconnecting portions and the array wafer bonding contact.

14. The 3D memory system of claim 13, wherein, the second interconnecting portion and the fourth interconnecting portion comprise the same number of the array wafer conductor layers and the same number of the array wafer connecting blocks.

15. The 3D memory system of claim 13, wherein, the first peripheral structure comprises a first peripheral wafer bonding contact and a second peripheral wafer bonding contact located at a contact surface of the peripheral wafer close to the array wafer, wherein, the first peripheral wafer bonding contact is electrically connected to an array wafer bonding contact of the plurality of array wafer bonding contacts, and wherein the array wafer bonding contact is electrically connected to the first interconnecting portion; and the second peripheral wafer bonding contact is electrically connected to the array wafer bonding contact and wherein the array wafer bonding contact is electrically connected to the second interconnecting portion.

16. The 3D memory system of claim 15, wherein, the first peripheral structure further comprises:

a first peripheral circuit; and a first peripheral wafer contact block and a second peripheral wafer contact block, wherein, the first peripheral wafer contact block electrically connects the first peripheral circuit to the first peripheral wafer bonding contact; and the second peripheral wafer contact block electrically connects the first peripheral circuit to the second peripheral wafer bonding contact.

17. The 3D memory system of claim 13, wherein, the array wafer further comprises a second contact, wherein the second contact electrically connects the second well region to the third interconnecting portion.

18. The 3D memory system of claim 13, wherein, the array wafer further comprises a first contact, wherein the first contact electrically connects the first well region to the first interconnecting portion.

19. The 3D memory system of claim 13, wherein, the second peripheral structure comprises a third peripheral wafer bonding contact and a fourth peripheral wafer bonding contact located at a contact surface of the peripheral wafer close to the array wafer, wherein, the third peripheral wafer bonding contact is electrically connected to an array wafer bonding contact of the plurality of array wafer bonding contacts, and wherein the array wafer bonding contact is electrically connected to the third interconnecting portion; and the fourth peripheral wafer bonding contact is electrically connected to the array wafer bonding contact, and wherein the array wafer bonding contact is electrically connected to the fourth interconnecting portion.

20. The 3D memory system of claim 19, wherein, the second peripheral structure further comprises:

a second peripheral circuit; and a third peripheral wafer contact block and a fourth wafer contact block, wherein, the third peripheral wafer contact block electrically connects the second peripheral circuit to the third peripheral wafer bonding contact; and the fourth peripheral wafer contact block electrically connects the second peripheral circuit to the fourth peripheral wafer bonding contact.

* * * * *